United States Patent
Bellomo

(10) Patent No.: US 9,048,659 B2
(45) Date of Patent: Jun. 2, 2015

(54) ENERGY STORAGE SUBSYSTEM FOR A VEHICLE

(71) Applicant: ALSTOM TRANSPORT SA, Levallois Perret (FR)

(72) Inventor: Jean-Philippe Bellomo, Aureilhan (FR)

(73) Assignee: ALSTOM Transport Technologies, Lavallois Perret (FR)

(*) Notice: Subject to any disclaimer, the term of this patent is extended or adjusted under 35 U.S.C. 154(b) by 63 days.

(21) Appl. No.: 13/768,674

(22) Filed: Feb. 15, 2013

(65) Prior Publication Data

US 2013/0215535 A1 Aug. 22, 2013

(30) Foreign Application Priority Data

Feb. 16, 2012 (FR) ..................... 12 51443

(51) Int. Cl.
*H01G 9/00* (2006.01)
*H02H 7/16* (2006.01)
*H01G 11/14* (2013.01)
*H01G 11/16* (2013.01)
*H02H 3/08* (2006.01)

(52) U.S. Cl.
CPC .................. *H02H 7/16* (2013.01); *H01G 11/16* (2013.01); *H01G 11/14* (2013.01); *H02H 3/08* (2013.01); *Y02T 10/7022* (2013.01); *B60L 2200/26* (2013.01)

(58) Field of Classification Search
USPC ..................................................... 361/16, 502
See application file for complete search history.

(56) References Cited

U.S. PATENT DOCUMENTS

| 6,072,691 | A  | * | 6/2000 | Suhara et al. | ................. 361/502 |
| 2007/0002518 | A1 |   | 1/2007 | Wilk et al. | |
| 2009/0174972 | A1 | * | 7/2009 | Wilk et al. | ...................... 361/15 |
| 2011/0140518 | A1 | * | 6/2011 | Hattori | ........................... 307/9.1 |

FOREIGN PATENT DOCUMENTS

DE 10 2005 018 339 A1 10/2006
EP 2 407 983 A1 1/2012

* cited by examiner

*Primary Examiner* — Danny Nguyen
(74) *Attorney, Agent, or Firm* — Sughrue Mion, PLLC

(57) ABSTRACT

An energy storage subsystem includes a metal casing and an electrical storage system mechanically fastened within the metal casing and including at least one super-capacitor module having a plurality of super-capacitors linked together in series. The subsystem includes at least one electrical protection device configured to open an electrical circuit to link electrical ground to either the metal casing or the super-capacitor module.

11 Claims, 5 Drawing Sheets

ENERGY STORAGE SUBSYSTEM FOR A VEHICLE

CROSS REFERENCE TO RELATED APPLICATIONS

This application is claiming priority based on French Patent Application No. 1251443 filed Feb. 16, 2012, the contents of all of which are incorporated herein by reference in their entirety.

BACKGROUND OF THE INVENTION

The present invention relates to an energy storage subsystem for vehicles, comprising:
a metal casing,
an electrical storage system mechanically fastened in the metal casing, and comprising at least one supercapacitor module, the or each module comprising a metal enclosure and a plurality of supercapacitors linked together in series and arranged in the metal enclosure.

Such an energy storage subsystem is notably designed to recover and store the braking energy of vehicles, in particular of rail vehicles travelling on a network. It can be installed permanently at a fixed point of the network or onboard one of the rail vehicles, the energy being in both cases stored in supercapacitors of the or each module of the subsystem.

It is commonplace for such a storage subsystem to comprise a network of supercapacitor modules connected in series, in order to obtain a significant energy reserve for the rail vehicle. When the storage subsystem is onboard a vehicle, the lowest potential of the network of modules is linked to the mechanical ground of the vehicle. Because of this, there is a significant voltage between the electrical ground of the vehicle and the internal elements of the modules furthest away from the mechanical ground, which exhibit a high electrical potential, for example roughly equal to 400 V. In practice, when the enclosure of the modules is metal, each of the modules being mechanically fixed to the mechanical ground, the voltage between this metal enclosure, exhibiting an electrical potential to the ground, and the internal cells of the module, is high. This high voltage does not however result in any flow of high currents in the modules, likely to damage the latter, because an insulating blanket is arranged between the enclosure of each module and the elements internal to the module.

However, in the case of failure of the internal insulation of a supercapacitor module, a short circuit to ground occurs with a very high current which is likely to result in the complete destruction of the module and a release of gas which is hazardous, even toxic, in the environment close to the module. This release of gas is due to the presence of electrolyte inside the supercapacitors, the electrolyte being volatilized when a current passes through the enclosure of the module, in the event of piercing for example.

BRIEF SUMMARY OF THE INVENTION

One of the aims of the invention is to propose an energy storage subsystem for vehicles that makes it possible, in case of the appearance of an internal insulation defect in one of the supercapacitor modules of the subsystem, to limit the short circuit current and the consequent temperature rise of the subsystem, and thus avoid any release of dangerous gases in the vicinity.

To this end, the subject of the invention is an energy storage subsystem for vehicles of the abovementioned type, characterized in that it also comprises at least one electrical protection device.

According to other embodiments, the energy storage subsystem for vehicles comprises one or more of the following features, taken in isolation or in all technically possible combinations:
the electrical storage system comprises at least two supercapacitor modules connected in series;
the or each electrical protection device links a supercapacitor module to an electrical ground;
the or each electrical protection device links the metal casing to an electrical ground;
the or each electrical protection device comprises a fuse;
the energy storage subsystem also comprises at least one electrical circuit opening detection member;
the or each electrical circuit opening detection member comprises a threshold voltage detector, electrically connected in parallel with a fuse;
the or each threshold voltage detector comprises a galvanic isolation switching member;
the or each fuse is a striker fuse and the or each electrical circuit opening detection member comprises a switch, said switch being mechanically linked to a striker fuse.

Another subject of the invention is an energy storage system for vehicles comprising a high voltage main isolating member, characterized in that it also comprises an energy storage subsystem as described previously, linked to the high voltage main isolating member.

Another subject of the invention is a rail vehicle, characterized in that it comprises an energy storage system as described previously.

The invention will be better understood on reading the following description, given solely as an example and with reference to the appended drawings, in which:

DETAILED DESCRIPTION OF THE INVENTION

Figure 1:
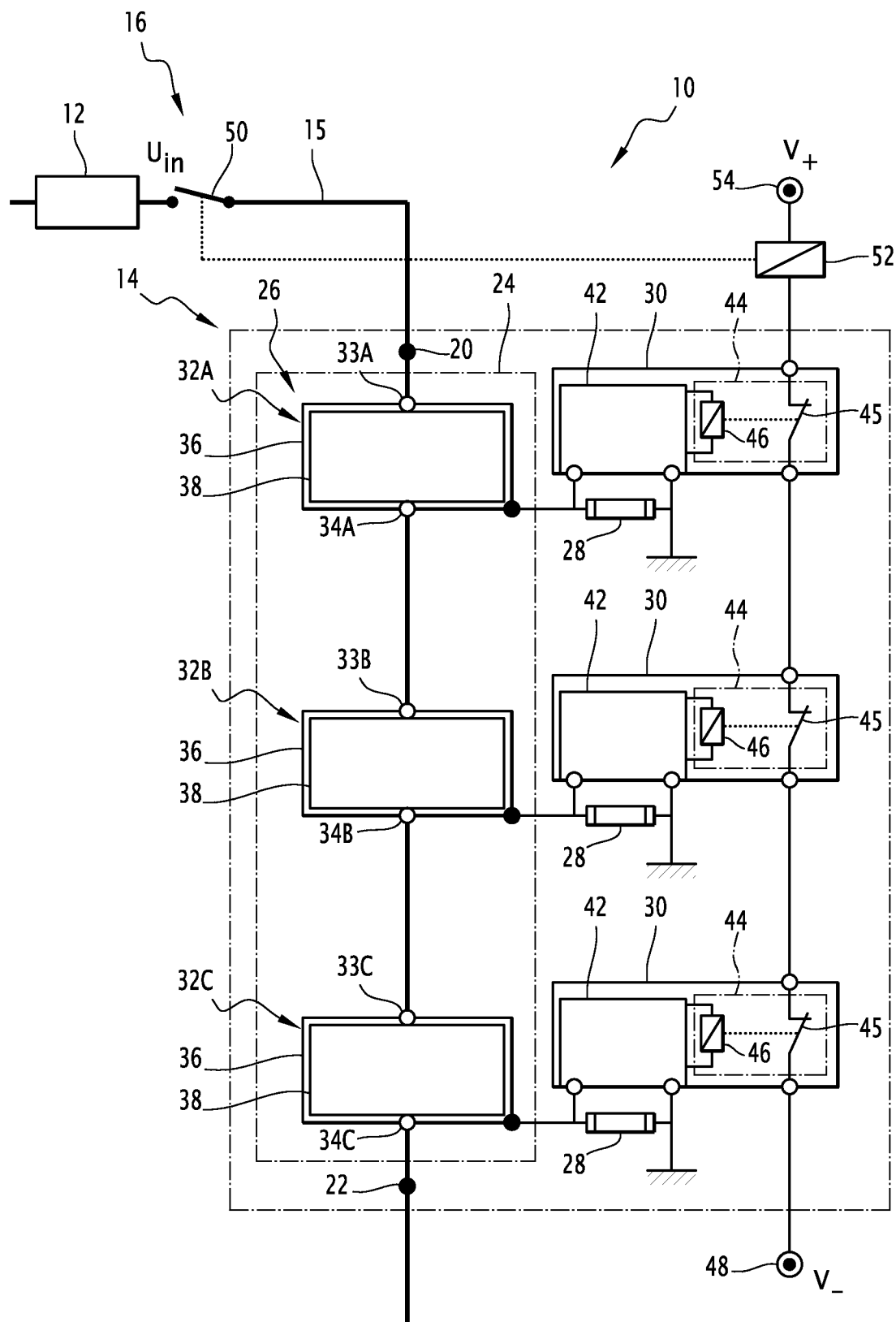
FIG. 1 is a schematic view of an energy storage system according to a first embodiment of the invention, comprising three supercapacitor modules.

In FIG. 1, an energy storage system 10, installed onboard a rail vehicle, is linked to a power converter 12. The power converter 12 is, for example, a voltage chopper installed onboard the rail vehicle and designed to be linked to an overhead line. The voltage chopper is notably designed to lower the voltage of the current circulating in the overhead line to deliver a continuous nominal serviceable voltage Uin, applicable as input for the energy storage system 10. The voltage Uin has a value which is, for example, roughly equal to 400 V.

The energy storage system 10 comprises an energy storage subsystem 14 according to the invention and an electrical connector 15 linking the voltage chopper 12 to the subsystem 14. It also comprises a high voltage main isolating member 16, for example a circuit breaker, connected to the chopper 12 and linked to the subsystem 14 via the electrical connector 15.

The energy storage subsystem 14 comprises an input terminal 20 designed to receive the input voltage Uin, an output terminal 22 linked to an electrical ground, a metal casing 24 and an electrical storage system 26 mechanically fastened in the metal casing 24. A subsystem 14 also comprises three electrical protection devices 28, and three electrical circuit opening detection members 30, each linked on the one hand to a device 28 and on the other hand to the circuit breaker 16. In the exemplary embodiment, each electrical protection device 28 is a fuse and each electrical circuit opening detection member 30 is a threshold voltage detector.

The electrical storage system 26 is linked on the one hand to the input terminal 20 and on the other hand to the output terminal 22. It comprises a first supercapacitor module 32A, a second supercapacitor module 32B and a third supercapacitor module 32C. The three supercapacitor modules 32A, 32B, 32C are linked in series in that order.

Each supercapacitor module 32A, 32B, respectively 32C, comprises an input terminal 33A, 33B, respectively 33C, and an output terminal 34A, 34B, respectively 34C. Each supercapacitor module 32A, 32B, respectively 32C, also comprises a metal enclosure 36 and an insulating blanket 38 arranged in the metal enclosure 36.

Figure 2:
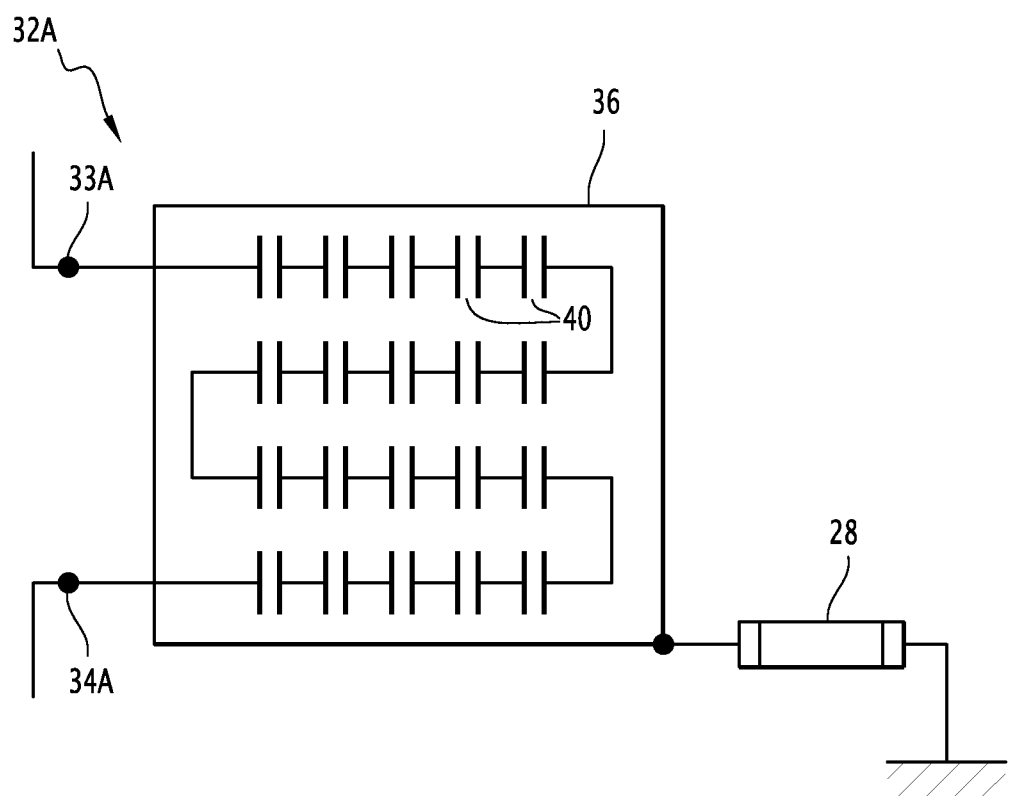
FIG. 2 is an electrical diagram of one of the supercapacitor modules of the energy storage system of FIG. 1.

As illustrated in FIG. 2, the first supercapacitor module 32A also comprises twenty supercapacitors 40 arranged in the metal enclosure 36 and linked together in series between the input terminal 33A and the output terminal 34A.

The second 32B and third 34C supercapacitor modules have a structure that is identical to that of the first module 32A; the latter is therefore not described in more detail hereinbelow.

As a variant, each supercapacitor module 32A, 32B, 32C comprises a number N1 of supercapacitors 40 linked together in series, N1 being an integer greater than or equal to two.

The input terminal 33A of the first module 32A is connected to the input terminal 20. The output terminal 34A of the first module 32A is connected to the input terminal 33B of the second module 32B. The output terminal 34B of the second module 32B is connected to the input terminal 33C of the third module 32C. The output terminal 34C of the third module 32C is connected to the output terminal 22.

The metal enclosure 36 of each module 32A, 32B, 32C defines a box inside which the supercapacitors 40 are arranged. The metal enclosure 36 of each module 32A, 32B, 32C is also electrically insulated from the input terminal and from the output terminal of said module, as well as from the metal enclosure 36 of the adjacent modules. For example, a layer of an electrically insulating material is arranged between two adjacent metal enclosures 36. The metal enclosure 36 of each module 32A, 32B, 32C is thus electrically insulated from the metal casing 24.

The insulating blanket 38 covers the entire internal surface of the metal enclosure 36. The insulating blanket 38 is designed to electrically insulate the supercapacitors 40 from the metal enclosure 36, as is known per se.

Each supercapacitor 40 is characterized by an electrical capacitance with a value of between 1,000 F and 10,000 F, for example equal to 3,000 F, and by a serviceable voltage with a value for example equal to 2.7 V.

Each fuse 28 is connected between, on the one hand, the metal enclosure 36 of a supercapacitor module 32A, 32B, 32C, and, on the other hand, an electrical ground.

Each fuse 28 is characterized by a rated value corresponding to a maximum admissible current intensity value.

Each threshold voltage detector 30 is connected in parallel with a fuse 28 and takes the form of an electronic circuit board, powered by an external power supply which is not represented. Each threshold voltage detector 30 comprises a member 42 for detecting a voltage at the terminals of the fuse 28. It also comprises a galvanic isolation switching member 44, electrically connected to the member 42.

The detection member 42 is designed to measure the voltage at the terminals of the corresponding fuse 28 and generate an electrical signal, for example a constant current, when the voltage that it measures exhibits a non-zero value.

The galvanic isolation switching member 44 comprises a switch 45 and an actuator 46, mechanically linked to the switch 45. In the exemplary embodiment, the galvanic isolation switching member 44 is an electromechanical relay and the actuator 46 is an electromagnet.

The galvanic isolation switching member 44 is designed to electrically isolate the electronics implemented in the measurement member 42 from the control electronics implemented to control the circuit breaker 16.

The switch 45 can move between an open position and a closed position. The switch 45 is designed to switch from its closed position to its open position, and vice versa, under the mechanical control of the electromagnet 46.

The electromagnet 46 is designed to control the opening or the closure of the switch 45. When a current flows within the electromagnet 46, a magnetic field is created, thus triggering the displacement of a soft iron core inside the electromagnet 46, and mechanically opening the switch 45. Conversely, when no current is flowing within the electromagnet 46, the soft iron core is displaced to another position, and mechanically closes the switch 45.

As a variant, the galvanic isolation switching member 44 is a solid-state relay. The actuator 46 is then an optocoupler, linked by optical pathway to the switch 45. The switch 45 is, according to this variant, a semiconductor component whose electrical state is designed to switch from a block state to a passing state, and vice versa.

Each supercapacitor module 32A, 32B, 32C is associated with a switch 45, the three switches 45 being connected together in series between a constant voltage source 48 and the circuit breaker 16.

The constant voltage source 48 has a constant electrical potential $V_-$ with a value for example substantially equal to 0 V.

Each threshold voltage detector 30 is advantageously designed to be linked to a restoration interface installed permanently onboard the rail vehicle. Once generated by a member 42, the electrical signal corresponding to the detection of a voltage is then sent to said interface by the corresponding detector 30. The interface is then able to visually restore to a user information indicating which supercapacitor module is exhibiting an electrical insulation fault.

The circuit breaker 16 is designed to automatically cut the current flowing in the electrical connector 15, for example in case of short circuit between the input and output terminals of each supercapacitor module 32A, 32B, 32C, as is known per se.

The circuit breaker 16 comprises a switch 50 and an actuator 52 mechanically linked to the switch 50 for its actuation, as is known per se.

The switch 50 can move between an open position and a closed position of the electrical connector 15. The switch 50 is designed to switch from its closed position to its open position, and vice versa, under the mechanical control of the actuator 52.

The actuator 52 is electrically connected between the switch 45 corresponding to the first supercapacitor module 32A and a constant voltage source 54.

The constant voltage source 54 exhibits a constant electrical potential $V_+$ with a value for example substantially equal to 24 V. The electrical potentials $V_-$, respectively $V_+$, presented by the voltage sources 48, respectively 54, are different, thus allowing for the flow of a current within the actuator 52 and the switches 45.

The actuator 52 is designed to control the opening or the closure of the switch 50, according to a principle similar to that explained previously for the electromagnet 46 and the switch 45. When a current flows within the actuator 52, the switch 50 is closed. When no current flows within the actuator 52, the switch 50 opens.

As a variant, the electrical storage system 26 comprises a number N2 of supercapacitor modules linked together in series and/or in parallel, N2 being an integer greater than or equal to two.

The operation of the energy storage system 10 will now be explained.

It is assumed for the description that the system 10 is initially in service, in other words that it is powered by the voltage chopper 12, and that the switch 50 is closed. No current is flowing in the fuses 28, and the voltages at the terminals of said fuses 28 each exhibit a zero value. The switches 45 are therefore closed and a constant voltage Uc is applied to the actuator 52 of the circuit breaker 16, thus keeping the switch 50 closed.

The voltage Uc is given by the formula: $Uc=V_+-V_-$.

In case of failure of the internal insulation of a supercapacitor module 32A, 32B, 32C, possibly, for example, caused by a wear defect on an insulating blanket 38, a short circuit appears between the metal enclosure 36 and the electrical ground. Because of the appearance of this short circuit to the ground, a short circuit current flows within the fuse 28 corresponding to the defective module. This short circuit current increases, until its intensity reaches the rating value of the fuse 28. As soon as this value is exceeded, the fuse 28 opens, resulting in the cancellation of the intensity of the short circuit current. The voltage at the terminals of the fuse 28, measured by the corresponding member 42, then exhibits a non-zero value. The member 42 generates a current flowing within the electromagnet 46 and the corresponding switch 45 opens. The constant voltage signal Uc is then no longer applied to the actuator 52, which results in the opening of the switch 50. The system 10 is no longer powered by the voltage step-down chopper 12, thus allowing for a maintenance intervention on the part of an operator.

In the particular exemplary embodiment according to which each threshold voltage detector 30 is linked to a restoration interface installed permanently onboard the rail vehicle, the operator responsible for intervening also knows the identity of the defective supercapacitor module.

It will be understood that such an energy storage subsystem 14 makes it possible, in case of the appearance of an internal insulation defect in one of the supercapacitors modules of the subsystem 14, to limit the short circuit current and therefore the temperature rise of the subsystem. Such an energy storage subsystem 14 thus makes it possible to avoid release of dangerous gas into the immediate environment of the passengers of the rail vehicle.

Moreover, the energy storage subsystem 14 according to this first embodiment is easier to construct mechanically, compared to the second embodiment described hereinbelow using FIG. 3.

Figure 3:
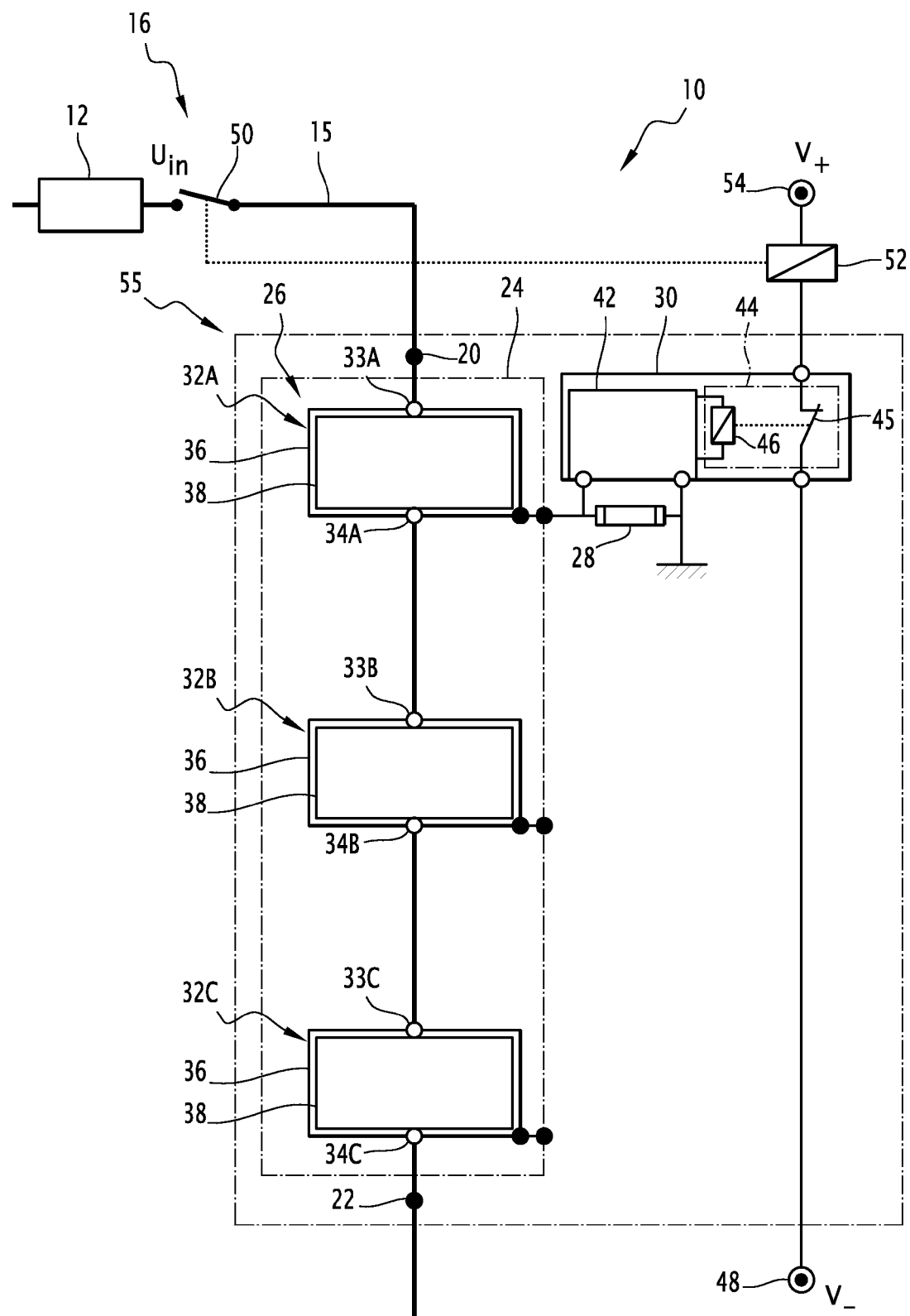
FIG. 3 is a schematic view of an energy storage system according to a second embodiment of the invention.

A second energy storage subsystem 55 according to the invention is represented in FIG. 3. In this figure, the elements that are similar to the first embodiment described previously are identified by identical references.

According to this second embodiment, the energy storage subsystem 55 comprises a fuse 28 and a threshold voltage detector 30, connected in parallel with the fuse 28 and linked to the circuit breaker 16.

Moreover, the fuse 28 is connected between, on the one hand, the metal casing 24, and, on the other hand, an electrical ground. The metal enclosure 36 of each module 32A, 32B, 32C is also electrically linked to the metal casing 24.

The energy storage subsystem 55 according to this second embodiment corresponds to the association of all the modules 32A, 32B, 32C with one fuse 28 and with one threshold voltage detector 30.

As a variant, the person skilled in the art will understand that it is possible to construct N3 subgroups of modules in the same way, each subgroup being associated with a fuse 28 and with a threshold voltage detector 30, N3 being an integer greater than or equal to two and less than the total number of modules.

The advantageous connection of the threshold voltage detector 30 to a restoration interface installed permanently onboard the rail vehicle is not envisaged according to this embodiment, the advantages linked to this connection here being nonexistent.

The operation of the energy storage subsystem 55 will now be described.

In case of failure of the internal insulation of a supercapacitor module 32A, 32B, 32C, a short circuit appears between the metal enclosure 36 and the metal casing 24. Because of the appearance of this short circuit, a short circuit current flows within the fuse 28. The rest of the operation of the energy storage subsystem 55 is identical to that of the energy storage subsystem 14, and is therefore not described in more detail.

By comparison with the energy storage subsystem 14 according to the first embodiment, the energy storage subsystem according to this embodiment occupies a more restricted space within the energy storage system 10, which makes it possible to substantially reduce the manufacturing costs.

The other advantages of this second embodiment, concerning the energy storage subsystem, are identical to those of the first embodiment, and are therefore not described again.

Figure 4:
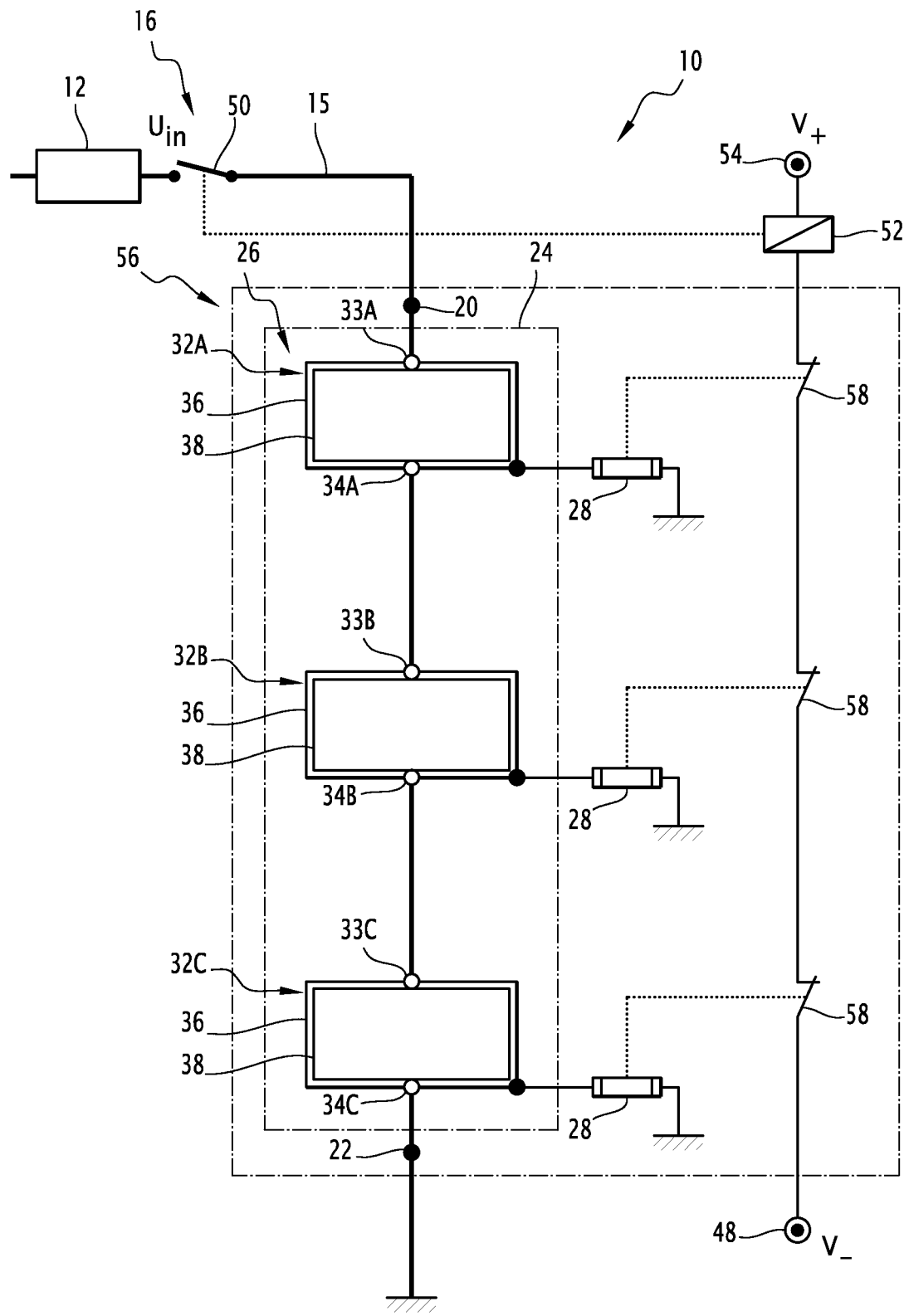
FIG. 4 is a schematic view of an energy storage system according to a third embodiment of the invention.

A third energy storage subsystem 56 according to the invention is represented in FIG. 4. In this figure, the elements similar to the first embodiment described previously are identified by identical references.

According to this third embodiment, each fuse 28 is a striker fuse.

Furthermore, each threshold voltage detector 30 is replaced by a switch 58, mechanically linked to a striker fuse 28.

Each supercapacitor module 32A, 32B, 32C is associated with a switch 58, the three switches 58 being connected together in series between the constant voltage source 48 and the actuator 52.

The actuator 52 is electrically connected between the switch 58 corresponding to the first supercapacitor module 32A and the constant voltage source 54.

Each striker fuse 28 is designed, when the current passing through it reaches the rating value of the fuse, to open and mechanically strike, during this opening, the switch 58 to which it is linked.

Each switch 58 can move between a closed position and an open position and is designed, under the effect of a mechanical strike, to switch from its closed position to its open position.

The operation of the energy storage subsystem 56 will now be explained.

Initially, the system 10 is in service, the switch 50 and the switches 58 are closed.

When a short circuit to ground appears within one of the supercapacitor modules 32A, 32B, 32C, a short circuit current flows within the striker fuse 28 corresponding to the defective module. This short circuit current increases, until its intensity reaches the rating value of the striker fuse 28. As soon as this value is exceeded, the striker fuse 28 opens, resulting in the cancellation of the intensity of the short circuit current. The striker fuse 28 mechanically strikes the switch 58 to which it is linked, resulting in the opening of said switch. The constant voltage signal Uc is then no longer applied to the actuator 52, which results in the opening of the switch 50.

Since the detection of an internal insulation defect within one of the supercapacitor modules is performed by entirely mechanical means in this third embodiment of the invention, the latter offers the advantage of enhancing the reliability of the detection, compared to the first embodiment described previously, in which the detection is performed by a combination of electronic and mechanical means.

Figure 5:
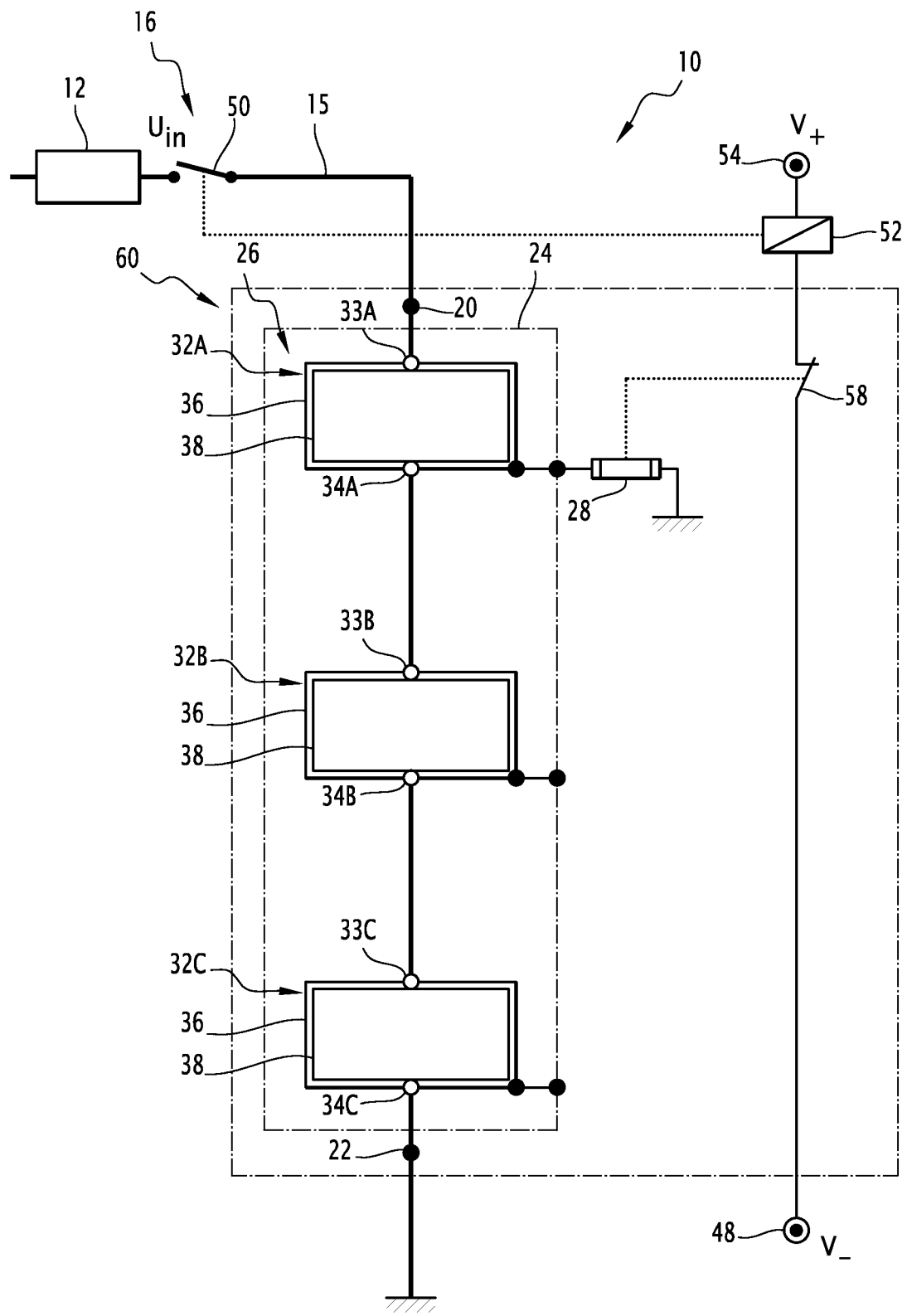
FIG. 5 is a schematic view of an energy storage system according to a fourth embodiment of the invention.

A fourth energy storage subsystem 60 according to the invention is represented in FIG. 5. In this figure, the elements similar to the third embodiment described previously are identified by identical references.

According to this fourth embodiment, the energy storage subsystem 60 comprises a striker fuse 28 and a switch 58, mechanically linked to the striker fuse 28, and electrically connected between the constant voltage source 48 and the actuator 52.

Moreover, the striker fuse 28 is connected between, on the one hand, the metal casing 24, and, on the other hand, an electrical ground. The metal enclosure 36 of each module 32A, 32B, 32C is also electrically linked to the metal casing 24.

The operation of the energy storage subsystem 60 will now be described.

In case of failure of the internal insulation of a supercapacitor module 32A, 32B, 32C, a short circuit appears between the metal enclosure 36 and the metal casing 24. Because of the appearance of this short circuit, a short circuit current flows within the striker fuse 28. The rest of the operation of the energy storage subsystem 60 is identical to that of the energy storage subsystem 56, and is therefore not described in more detail.

The advantages of this fourth embodiment, concerning the energy storage subsystem, are identical to those of the second embodiment and of the third embodiment, and are therefore not described again.

It will thus be understood that the energy storage subsystem according to the invention makes it possible, in case of appearance of an internal insulation defect in one of the supercapacitor modules of the subsystem, to limit the short circuit current and the consequent temperature rise of the subsystem.

The invention claimed is:

1. An energy storage subsystem (14; 55; 56; 60) for a vehicle, comprising:
    a metal casing (24),
    an electrical storage system (26) mechanically fastened in the metal casing (24), and comprising at least one supercapacitor module (32A, 33A, 34A), each module (32A, 33A, 34A) comprising a metal enclosure (36) and a plurality of supercapacitors (40) linked together in series and arranged in the metal enclosure (36),
    at least one electrical protection device (28) designed to open an electrical circuit, characterized in that the electrical protection device (28) links to an electrical ground of the metal casing (28) or of the supercapacitor module (32A, 33A, 34A).

2. The energy storage subsystem (14; 55; 56; 60) according to claim 1, characterized in that the electrical storage system (26) comprises at least two supercapacitor modules (32A, 33A, 34A) connected in series.

3. The energy storage subsystem (14; 55; 56; 60) according to claim 1, characterized in that the electrical protection device (28) comprises a fuse.

4. The energy storage subsystem (14; 55; 56; 60) according to claim 3, further comprises at least one electrical circuit opening detection member (30; 58).

5. The energy storage subsystem (14; 55) according to claim 4, characterized in that each electrical circuit opening detection member comprises a threshold voltage detector (30), electrically connected in parallel with the fuse (28).

6. The energy storage subsystem (14; 55) according to claim 5, characterized in that the threshold voltage detector (30) comprises a galvanic isolation switching member (44).

7. The energy storage subsystem (56; 60) according to claim 4, characterized in that the fuse is a striker fuse and the electrical circuit opening detection member comprises a switch (58), said switch (58) being mechanically linked to the striker fuse (28).

8. An energy storage system (10) for a vehicle, comprising an energy storage subsystem (14; 55; 56; 60) and a high voltage main isolating member (16) linked to the subsystem (14; 55; 56; 60), characterized in that the energy storage subsystem (14; 55; 56; 60) according to claim 1.

9. A rail vehicle, characterized in that it comprises an energy storage system (10) according to claim 8.

10. The energy storage subsystem (56; 60) according to claim 1, wherein an insulating blanket is provided in the metal enclosure.

11. The energy storage subsystem (56; 60) according to claim 1, further comprising:
    at least two supercapacitor modules each comprising a metal enclosure,
    wherein the metal enclosure of a first supercapacitor module is electrically insulated from an input terminal and from an output terminal of said first supercapacitor module, and from a metal enclosure of a second adjacent supercapacitor module.

* * * * *